March 30, 1965        E. F. ADAMS        3,176,296
PULSE COMPRESSION RADAR SYSTEM
Filed Aug. 1, 1963
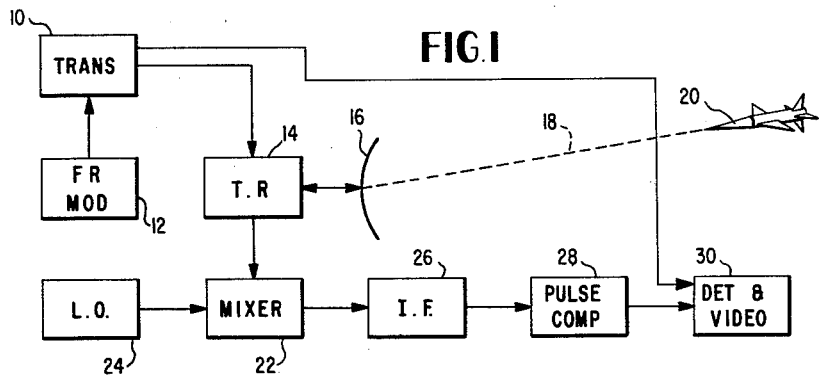
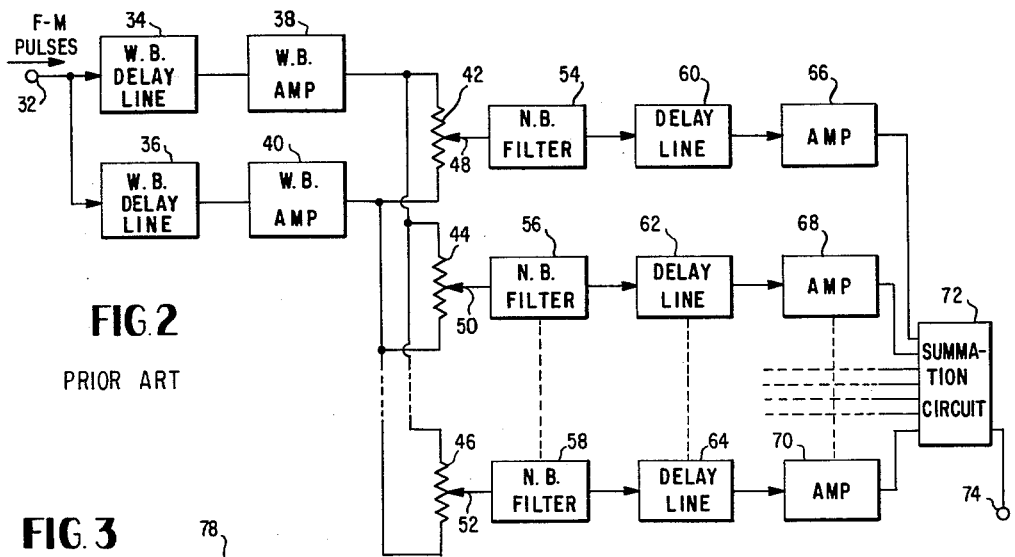
FIG. 2 PRIOR ART
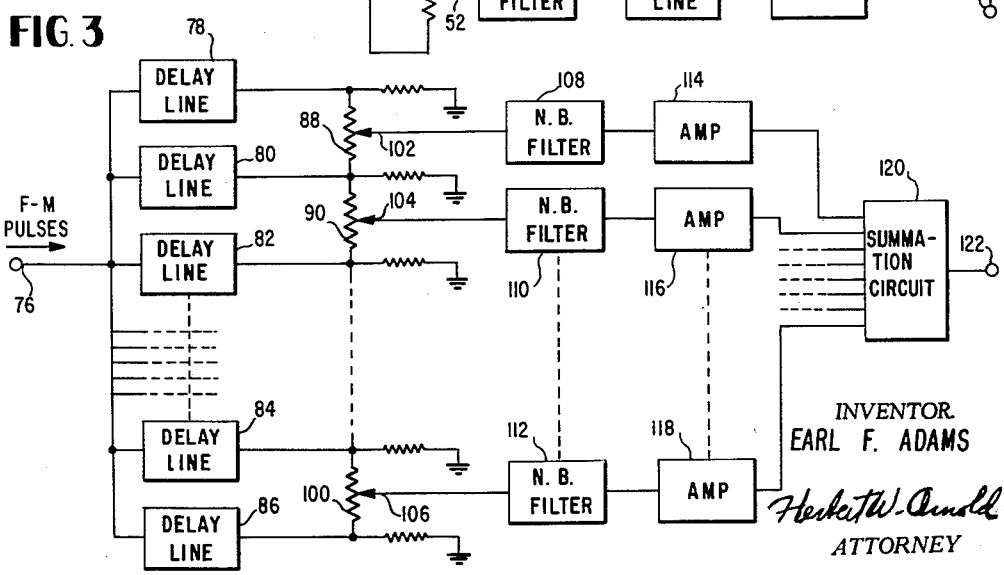
INVENTOR.
EARL F. ADAMS
ATTORNEY 3,176,296
PULSE COMPRESSION RADAR SYSTEM
Earl F. Adams, Woburn, Mass., assignor to Raytheon
Company, Lexington, Mass., a corporation of Delaware
Filed Aug. 1, 1963, Ser. No. 299,325
11 Claims. (Cl. 343—17.2)

This invention pertains generally to radar and other echo-ranging systems, and more particularly to radars of the pulse compression type.

Generally speaking, electronic echo-ranging or radar systems employ a transmitter for generating and transmitting a series of high frequency, short duration pulses, with the radiation usually taking the form of a beam directed toward one or more targets from which the pulse energy is reflected to a suitable receiver means, usually at the transmitter site.

In order to provide good range resolution, it is generally necessary to have as many as possible of the echo pulses appear as distinct returns in the receiver. This calls for pulses of short duration so as to be able to provide individual returns or echoes for each target, even when many targets are at substantially the same range from radar transmitter.

However, and as is well known in the art, in order to provide a radar system which has good range characteristics, i.e., long range capability, as opposed to fine range resolution, it is necessary to make available a large amount of power for each transmitted pulse, since maximum object detection range depends upon the average power transmitted, and the latter is directly related to the pulse energy. If the power is to be increased to provide long-range operation, and the pulse duration is to be decreased in order to enhance range resolution, it would appear that the pulse height or amplitude must be increased. However, as the pulse amplitude is increased, the voltages on the several components of the transmitter are correspondingly increased, sometimes resulting in sparking and deterioration of the usual performance of the system. This sparking may occur at any of several points, such as at the magnetron or other analogous device, or even at the antenna itself.

One solution to the problem thus presented by these two divergent characteristics is found in a system known as pulse compression. Since sparking is a result of an excessive voltage or pulse amplitude, not the actual power or energy content, it is only the voltage which must be maintained below a given level at the transmitter. This observation provides a basis for the pulse compression system and a solution to the dilemma of simultaneously achieving high resolution and sufficient range.

Briefly stated, pulse compression involves the transmission of relatively low amplitude, long duration pulses, whereby sufficient energy is radiated for maximum range without incurring transmitter sparking, with the subsequent transformation of the long duration echo or received pulses into high amplitude pulses of relatively short duration.

One method of performing a suitable transmission and subsequent echo reception with pulse compression is the radiation of long duration pulses having a relatively wide frequency bandwidth, e.g., low amplitude, long duration, frequency modulated pulses. Since the velocity of propagation of electrical energy through certain circuits is dependent upon the frequency of such energy, such circuits can be employed to selectively delay the several times segments of a signal which has been progressively modulated in frequency, as, for example, in frequency sweep modulation or stepped-frequency modulation. More specifically, if a signal is applied to a low-pass filter network, the velocity of propagation of the signal is a function of the frequency thereof, with the velocity being a maximum for low frequencies and decreasing with increasing frequency.

If the modulation is stepped-frequency modulation, a plurality of contiguous pulse segments of incrementally different frequencies is applied to the filter circuit, with each pulse segment having a respective velocity therethrough dependent upon the frequency of such pulse. Where the first signal segments are of relatively high frequency, with subsequent segments being of incrementally decreasing frequencies, it can be seen that the later applied signal segments of greater velocity will overtake the earlier, slower-moving segments, with the result that the segments are bunched so as to tend to appear at the filter output at substantially the same time, thus providing a pulse that is compressed in time, being characterized by shorter duration and greater amplitude than the echo pulse or the corresponding pulse radiated by the transmitter.

In the pulse compression circuits of the prior art, it has been necessary to employ wide band amplifiers and wide band delay lines in addition to a plurality of narrow band delay lines in order to provide the desired pulse compression operation. As will be appreciated by those skilled in the art, wide band amplifiers and wide band delay lines add materially to the cost of an equipment, and a considerable saving can be effected by their elimination.

It is accordingly a primary object of the present invention to provide pulse compression circuitry which affords the operational characteristics of the circuits of the prior art without the use of the wide band amplifiers and the wide band delay lines of such prior art.

A more specific object of the invention is to provide a radar receiver circuit of the pulse compression type which eliminates the wide band amplifiers and wide band delay lines of the prior art.

A further object of the invention is to provide a pulse compression circuit suitable for inclusion in a radar or other echo-ranging system where the wide band amplifiers and wide band delay lines of the prior art are eliminated.

In accordance with the present invention, the above and other objects are achieved by means of a pulse compression circuit including a plurality of delay lines of incrementally different lengths, means for applying input pulses to the inputs of all of the delay lines simultaneously, means for interconnecting the outputs of the several delay lines in ordered incremental sequence, with the outputs of each pair of adjacent delay lines being connected in phase opposition to provide respective hybrid signals each constituting a time-displaced pair of output signals from such respective adjacent delay lines, a plurality of narrow band filters to each of which a respective one of the hybrid signals is applied, with each of the filters being tuned to a respectively different portion of the frequency range of the frequency modulation of the input signals and means for combining the outputs of the several filter means to provide an output representative of the summation of the filter outputs. The frequency range of the frequency modulation content of the input signals is covered by means of time-sharing operation of the aforementioned adjacent pairs of delay lines, and the delay lines themselves need not therefore each be wide band in nature.

In one preferred form of a radar system in which the pulse compression circuit of the present invention may be incorporated, the system includes means for generating and transmitting carrier wave pulses of a given amplitude and duration, with each of such pulses being modulated in frequency over a given frequency range, means for receiving echo pulses corresponding to the transmitted pulses, means for converting the received echo pulses of carrier wave frequency into corresponding pulses of intermediate frequency, the pulse compression circuit of the present invention and means for detecting the output of the pulse compression circuit to provide an output corresponding to the modulation employed in the transmitter, whereby the pulses applied to the detecting means are of shorter duration and greater amplitude than the received echo pulses.

With the above considerations and objects in mind, the invention itself will now be described in connection with a preferred embodiment thereof given by way of example and not of limitation, and with reference to the accompanying drawings, in which:

FIG. 1 is a block diagram of a representative pulse compression radar system.

FIG. 2 is a block diagram of a pulse compression circuit illustrative of the prior art.

FIG. 3 is a block diagram of a prefered form of the pulse compression circuit of the present invention.

The exemplary pulse compression radar circuit of FIG. 1 includes an oscillator and other transmitter circuitry indicated by the block 10, with means 12 for effecting frequency modulation of the high frequency pulse signal developed in the transmitter 10. As will be appreciated by those skilled in the art, the present invention is applicable to any of several forms of frequency modulation which might be applied to the transmitter 10, but for the purposes of the description of the present invention, it will be assumed that the frequency modulation effected by the circuitry in block 12 is sequentially stepped in nature. That is to say, the pulses which are the output of the transmitter 10 comprise packets of contiguous time segments of incrementally different frequencies.

The stepped-frequency pulses generated by transmitter 10 are applied to a transmit-receive switch 14 and then fed to a typical radar antenna 16 which radiates a beam of electromagnetic energy corresponding to the stepped-frequency pulses generated at the transmitter. The dotted line 18 represents both the beam of transmitted pulses radiated from the antenna 16 and the return or echo pulses reflected from a target 20 toward the antenna 16, with the antenna also constituting the means for receiving such echo pulses.

The echo or return signal is fed from the antenna 16 to the transmit-receive switch 14, which, in turn, applies the received signals to one input of a mixer circuit 22. As is well known to those skilled in the art, the transmit-receive switch 14 serves the dual purpose of preventing the high power pulses generated in the transmitter 10 from being applied to the receiver circuitry, while also directing received pulses toward such receiver circuitry instead of the transmitter circuits.

The remainder of the receiver circuitry includes a local oscillator 24 which is connected to a second input of the mixer circut 22, and which is of such frequency relative to the carrier frequency of the return or echo signals as to heterodyne with the latter signals to provide an intermediate fequency output from the mixer 22 at a desired third frequency.

The output of the mixer 22 is amplified in a suitable intermediate frequency amplifier 26 and is then applied to a pulse compression circuit 28 before proceeding to the detector and video or other display system indicated by block 30. As stated above, the function of the pulse compression circuit 28 is to shorten or compress the several received or echo pulses (at the intermediate frequency), so as to provide narrow high-amplitude pulses to the detector and video circuits to afford improved range resolution.

The operation of the circuitry shown in FIG. 1 is evident from the description of the circuit arrangement. The transmitter 10 generates a series of high frequency pulses, and each of the pulses is frequency modulated over a desired frequency range. In a preferred form, the modulation applied by the modulator 12 to the transmitter 10 takes the form of stepped-frequency modulation, with the result that each pulse generated in the transmitter 10 comprises a packet of contiguous time segments of incrementally stepped frequencies.

The frequency modulated pulses emanating from the transmitter 10 pass through the transmit-receive switch 14 and are radiated in a beam 18 from the antenna 16. Upon striking a suitable target 20, such as an airplane, missile or the like, the frequency modulated pulses are reflected back toward the antenna 16, which now acts as a receiving antenna to pass the received or echo pulses, each of which retains its frequency modulated nature, to one input of mixer 22 through the transmit-receive switch 14. The other input of the mixer circuit 22 receives an appropriate high frequency signal from the local oscillator 24, and the two input signals mix to form an intermediate frequency output, such as a series of pulses each bearing the original frequency modulation and having a carrier frequency representative of the difference between the frequency of the local oscillator 24 and that of the oscillator in the transmitter circuit 10.

The intermediate frequency output of the mixer 22 is amplified in the intermediate frequency amplifier 26 and is then applied to the pulse compression circuit 28. This latter circuit includes a dispersive network or the like which affords a propagation velocity which is dependent upon the frequency of the energy applied thereto. The design of the transmitter circuitry is such that the frequency modulated pulses generated therein are of sufficiently low amplitude so as to avoid sparking and similar problems in the transmitter and antenna circuits, while also being of considerable length or duration so as to permit the transmitted pulse to have sufficient energy content to cover a desired maximum range to the target 20. When the intermediate frequency echo pulses corresponding to such transmitted pulses are applied to the pulse compression circuit 28, the several time segments of each such intermediate frequency pulse are differentially delayed so as to provide a pulse compression output wherein each pulse is materially reduced in duration and correspondingly increased in amplitude, due to the conservation of the energy within each pulse.

The compressed pulses from the pulse compression circuit 28 are applied to the detector and video display circuit 30 for extracting the modulation from the intermediate frequency carrier for display in the video system. Obviously, and as is customary in the radar art, a suitable reference signal is fed from the transmitter 10 to the video display circuit 30.

A typical pulse compression circuit of the prior art is shown in FIG. 2, wherein the frequency modulated pulses are applied to terminal 32 for simultaneous application to the inputs of two wide band delay lines 34 and 36. The outputs of the wide band delay lines 34 and 36 are applied to respective wide band high gain amplifiers 38 and 40, the outputs of which are applied simultaneously to a plurality of variable impedances 42, 44 and 46 in phase opposition. The signals thus appearing across the several impedances 42, 44 and 46 are taken at respective taps 48, 50 and 52 and applied to respective narrow band filters 54, 56 and 58. It will be understood that an appropriate number of impedances 42, 44 and 46 and associated circuits will be employed in accordance with the requirements of a given application; the leads from the amplifiers 38 and 40 to impedance 46 are shown in broken lines in FIG. 2 to indicate the possibility of inclusion of additional circuits similar to those presently being described herein.

The several narrow band filters 54, 56 and 58 are tuned to respectively different portions of the frequency range over which the input pulses are modulated, with the bandwidth of each filter and the total number of filters being such as to cover the entire range of frequency modulation. Preferably, the several filters 54, 56 and 58 are arranged in an ordered sequence in accordance with the frequencies at which they are designed to operate.

The outputs of the several filters 54, 56 and 58 are applied to respective delay lines 60, 62 and 64 before being passed through respective amplifiers 66, 68 and 70 to the respective inputs of a summation circuit 72. The several delay lines 60, 62 and 64 are characterized by respectively different delay times, and the several delay lines are preferably arranged in an ordered sequence of delay length which corresponds in a desired manner to the ordered sequence of the resonant frequencies of the several narrow band filters 54, 56 and 58 to which the delay lines are respectively connected. The particular manner in which the incrementally increased delay time is employed in connection with the several different narrow band filters is a matter of choice, as will be understood by those familiar with the art of pulse code techniques in stepped-frequency modulation. In any case, the several signals passing through the respective narrow band filters 54, 56 and 58 are respectively delayed by different periods in accordance with the design of the particular system, and are subsequently applied to the input of the summation circuit 72, the output 74 of which may be applied to any suitable circuit, such as the detector and video circuitry indicated at 30 in FIG. 1.

In the operation of the prior art circuitry of FIG. 2, pulse code stepped-frequency modulated pulses are applied to the inputs of the two wide band delay lines 34 and 36, one of which is longer than the other by one pulse width. The outputs of the two delay lines 34 and 36 are amplified in the respective amplifiers 38 and 40 and are then applied in phase opposition across the several impedances 42, 44 and 46. Due to the differential delay in passing through the day lines 34 and 36, a given pulse results in the appearance across the several impedances 42, 44 and 46 of a pair of oppositely phased pulses which are adjacent in time.

The composite signals taken at the several taps 48, 50 and 52 are then subjected to a frequency sorting operation by virtue of the ordered sequence of different resonant frequencies of the several narrow band filter circuits 54, 56 and 58, and it will be understood that the variable taps 48, 50 and 52 permit selective amplitude adjustment where needed. With the several time segments of the stepped-frequency modulated signal thus having been separated in accordance with their respective frequencies by the several filter circuits, such time segments are subjected to respectively different delays in the several delay line circuits 60, 62 and 64 so that the earlier time segments of a given pulse applied to terminal 32 are delayed more than later time segments, with the result that the outputs of the several amplifiers 66, 68 and 70 are applied to the summation circuit 72 at substantially the same time. In this manner, a given low amplitude, long duration, stepped-frequency pulse applied at terminal 32 will appear at output terminal 74 as a compressed or shortened pulse of considerably greater amplitude.

The block diagram of FIG. 3 illustrates a preferred form of the circuitry of the present invention, wherein the operation achieved by the circuitry of FIG. 2 is provided without the necessity for including the wide band delay lines and wide band amplifiers of FIG. 2. The input terminal 76 of FIG. 3 is connected directly to the inputs of several delay lines 78, 80, 82, 84 and 86, the outputs of respective adjacent pairs of which are connected to opposite ends of a series of respective impedances 88, 90 and 100. That is to say, the outputs of delay lines 78 and 80 are connected across impedance 88, while the outputs of delay lines 82 and 80 are connected across impedance 90, etc. In this manner, the outputs of each of the several delay lines are applied to each of two of the impedances, except for the case of the end delay lines 78 and 86.

The several delay lines 78, 80, 82, 84 and 86 are of respectively different lengths, and are preferably arranged in an ordered sequence in accordance with an incrementally increasing or decreasing delay line length. Each is tuned to a center frequency midway between the adjacent filter frequencies. That is, delay line 80 (in a preferred form) is one pulse length longer than delay line 78, so that the signals passing through delay lines 78 and 80 are combined in phase opposition in impedance 88 and appear therein as time-adjacent, oppositely-phased pulses, much in the manner of the combination of signals from delay lines 34 and 36 in FIG. 2. However, the output of delay line 80 in FIG. 3 is also combined in phase opposition with the output of delay line 82, being combined in impedance 90 and appearing therein as opposite-phased, time adjacent signal segments. This, there is a time-sharing operation for each of the relatively narrow band delay lines of the present invention (FIG. 3), except for the two end delay lines 78 and 86.

The several impedances 88, 90 and 100 have a plurality of respective taps 102, 104 and 106 thereon each leading to the input of a respective narrow band filter 108, 110 and 112. As in the case of the narrow band filters 54, 56 and 58 of FIG. 2, the filters 108, 110 and 112 of FIG. 3 are resonant at respectively different frequencies, and the band width and resonant frequency of each of the several filters 108, 110 and 112 are such that with the resonant frequencies thereof being arranged in an ordered incremental sequence as in the case of the filters of FIG. 2, the entire range of frequency employed in the frequency modulation in the input signals is covered.

Each of the narrow band filters 108, 110 and 112 is connected to a respective amplifier 114, 116 and 118, the outputs of which are connected to respective inputs of a summation circuit 120 having an output terminal 122.

In the operation of the circuit of the present invention as exemplified by the block diagram of FIG. 3, a series of pulses are applied to terminal 76, each comprising a packet of contiguous or time-adjacent segments of different frequencies arranged in an ordered sequence in accordance with a given stepped-pulse, frequency modulated technique. These input pulses are of relatively low amplitude and long duration as explained in connection with the description of FIG. 1 herein. Each input pulse at terminal 76 in FIG. 3 is applied simultaneously to the respective inputs of the several narrow band delay lines 78, 80, 82, 84 and 86, as well as any others that may be included in the delay line array (the dotted lines indicating the possibility of the addition of other delay lines). Due to the fact that the delay period or line length of one of each of the respective adjacent pairs of delay lines in FIG. 3 is greater by one pulse length than the other delay line of each such adjacent pair, the signals applied in phase opposition to the several impedances 88, 90 and 100 form time-adjacent hybrid signals. However, since the several delay lines 78, 80, 82, 84 and 86 are also arranged in an ordered sequence of increasing (or decreasing) delay period, the signals passing through the delay lines toward one end of the array will be delayed by a greater amount than those passing through the delay lines near the other end of the array. More specifically, if the delay line 78 is assumed to have the least amount of delay, with delay line 80 having a greater delay period by one pulse length and delay line 82 having a length that is two pulse widths greater than that of delay line 78, etc., the pulses passing through delay line 86 will be delayed by the greatest amount. Thus, it will be seen that the relatively narrow band delay lines of FIG. 3 perform a combined delay operation, performing not only the function of the two delay lines 34 and 36 of FIG. 2, but also the function of delay lines 60, 62 and 64 of that figure. This combined delay technique not only affords the possibility of employing fewer delay lines, but also enables one to design a circuit which will perform in the manner of that shown in FIG. 2 without the necessity of employing the relatively expensive wide band delay lines 34 and 36.

The remainder of the operation of the circuitry of FIG. 3 is quite analogous to that of FIG. 2, with the several hybrid signals being tapped from the respective impedances 88, 90 and 100 and fed through the respective narrow band filters 108, 110 and 112. The outputs of these filters are then applied directly to the amplifiers, without utilizing the delay lines 60, 62 and 64 of FIG. 2. Upon being subjected to the summation operation in block 120, the several contiguous segments of a stepped-frequency pulse applied to terminal 76 appear substantially simultaneously at the output terminal 122, thus constituting a pulse compression output which represents the conversion of a low-amplitude, long-duration pulse at terminal 76 into a short-duration, high-amplitude pulse, as is desired for good range resolution.

The invention has been described above in some detail, and particularly with reference to its application to a stepped-frequency pulse code modulation in the radar art. However, it will be apparent to those skilled in the art that the invention is also applicable to other types of frequency modulation, whether stepped or smoothly varied. Also, the combined delay technique of the present invention is not necessarily limited to the radar art per se, since similar techniques are employed in other analogous arts. Hence, the invention is not to be considered as limited to the particular details given, nor to the specific application to which reference has been made during the description of the system, except insofar as may be required by the scope of the appended claims.

What is claimed is:

1. An electronic echo-ranging system, comprising means for generating and transmitting carrier wave pulses of a given amplitude and duration, each of such pulses being modulated in frequency over a given frequency range; means for receiving echo pulses corresponding to such transmitted pulses; means for converting such received pulses of carrier wave frequency into corresponding pulses of intermediate frequency; a plurality of delay line means of incrementally different length; means for applying each of such intermediate frequency pulses to the input of all of said delay line means simultaneously; means interconnecting the outputs of said several delay line means in ordered incremental sequence, with the outputs of each pair of adjacent delay line means being connected in phase opposition to provide respective hybrid intermediate frequency signals each constituting a time-displaced pair of output signals from such respective adjacent delay line means; a plurality of narrow-band filter means to each of which a respective one of such hybrid signals is applied, each of said filter means being tuned to a respectively different portion of said modulation frequency range; means for combining the outputs of said several filter means and providing an output representative of the summation of such filter outputs, and means for detecting the output of said summation means to provide an output corresponding to the modulation employed in said transmitting means, whereby the pulses constituting the output of said summation means are of shorter duration and greater amplitude than such received echo pulses.

2. An electronic echo-ranging system in accordance with claim 1, wherein said interconnecting means includes unilaterally conducting means for preventing interaction between other than adjacent pairs of said delay line means.

3. An electronic echo-ranging system in accordance with claim 1, wherein each of said narrow-band filter means is connected to said summation means through a respective amplifier means.

4. An electronic echo-ranging system in accordance with claim 1, wherein said interconnecting means includes amplifier means for the output of each of said delay line means.

5. An electronic echo-ranging system in accordance with claim 4, wherein said amplifier means are respectively variable to provide selectable relative outputs.

6. In an electronic echo-ranging system employing stepped-frequency pulse code modulation, a pulses compression circuit for converting input pulses applied thereto into corresponding output pulses of shorter duration and greater amplitude, comprising a plurality of delay line means of incrementally different lengths; means for applying such input pulses to the inputs of all of said delay line means simultaneously; means interconnecting the outputs of said several delay line means in ordered incremental sequence, with the outputs of each pair of adjacent delay lines means being connected in phase opposition to provide respective hybrid signals each constituting a time-displaced pair of output signals from such respective adjacent delay line means; a plurality of narrow-band filter means to each of which a respective one of such hybrid signals is applied, each of said filter means being tuned to a respectively different portion of the frequency range of such stepped-frequency code modulation, and means for combining the outputs of said several filter means and providing an output representative of the summation of such filter outputs.

7. In an electronic echo-ranging system employing stepped-frequency pulse code modulation, a pulse compression circuit for converting input pulses applied thereto into corresponding output pulses of shorter duration and greater amplitude in accordance with claim 6, wherein said interconnecting means includes unilaterally conducting means for preventing interaction between other than adjacent pairs of said delay line means.

8. In an electronic echo-ranging system employing stepped-frequency pulse code modulation, a pulse compression circuit for converting input pulses applied thereto into corresponding output pulses of shorter duration and greater amplitude in accordance with claim 6, wherein each of said narrow-band filter means is connected to said summation means through a respective amplifier means.

9. In an electronic echo-ranging system employing stepped-frequency pulse code modulation, a pulse compression circuit for converting input pulses applied thereto into corresponding output pulses of shorter duration and greater amplitude in accordance with claim 6, wherein said interconnecting means includes amplifier means for the output of each of said delay line means.

10. In an electronic echo-ranging system employing stepped-frequency pulse code modulation, a pulse compression circuit for converting input pulses applied thereto into corresponding output pulses of shorter duration and greater amplitude in accordance with claim 9, wherein said amplifier means are respectively variable to provide selectable relative outputs.

11. In an electronic system employing frequency modulation, a signal compression circuit for converting input signals applied thereto into corresponding output signals of shorter duration and greater amplitude, comprising a plurality of delay line means of incrementally different lengths; means for applying said input signals to the inputs of all of said delay line means; means interconnecting the outputs of said several delay line means in ordered incremental sequence, with the outputs of each pair of adjacent delay line means being connected in phase opposition to provide respective hybrid signals each constituting a time-displaced pair of output signals from such respective adjacent delay line means; a plurality of narrow-band filter means to each of which a respective one of said hybrid signals is applied, each of said filter means being tuned to a respectively different portion of the frequency range of said frequency modulation; and means for combining the outputs of said several filter means.

References Cited by the Examiner
UNITED STATES PATENTS

| | | | |
|---|---|---|---|
| 2,024,900 | 12/35 | Wiener et al. | 343—17.2 |
| 2,913,717 | 11/59 | Brandon et al. | 343—17.2 |

References Cited by the Applicant
UNITED STATES PATENTS

| | | |
|---|---|---|
| 2,678,997 | 5/54 | Darlington. |
| 2,842,761 | 7/58 | Downs. |
| 2,896,205 | 7/59 | Berger. |
| 3,008,138 | 11/61 | Berger et al. |
| 3,028,593 | 4/62 | Alford. |

CHESTER L. JUSTUS, *Primary Examiner.*